United States Patent [19]

Szekely et al.

[11] Patent Number: 4,988,238

[45] Date of Patent: Jan. 29, 1991

[54] METHOD FOR IMPROVING THE STRENGTH AND IMPERMEABILITY OF SOILS AND ENGINEERING STRUCTURES

[75] Inventors: Tamas Szekely; Gabor Nagy; Andras Danko, all of Budapest; Janos Szepvolgyi, Tatabanya; Andras Gal; Oszkar Libor, both of Budapest, all of Hungary

[73] Assignee: Altalanos Iparfejlesztesi Rt., Budapest, Hungary

[21] Appl. No.: 429,945

[22] Filed: Oct. 31, 1989

[51] Int. Cl.$^5$ ............................................. E02D 3/12
[52] U.S. Cl. ................................... 405/263; 405/270; 166/292
[58] Field of Search .............. 405/263, 266, 258, 270; 166/292, 293, 294; 106/900

[56] References Cited

U.S. PATENT DOCUMENTS

| | | | |
|---|---|---|---|
| 4,404,105 | 9/1983 | Lockerente et al. | 405/263 X |
| 4,521,136 | 6/1985 | Murphey | 405/263 |
| 4,548,270 | 10/1985 | Eilers | 166/292 X |
| 4,640,361 | 2/1987 | Smith et al. | 166/292 X |
| 4,669,919 | 6/1987 | Hilterhaus et al. | 405/263 X |
| 4,762,443 | 8/1988 | Gourenot | 405/263 |

Primary Examiner—Dennis L. Taylor
Attorney, Agent, or Firm—Herbert Dubno; Jonathan Myers

[57] ABSTRACT

A method is disclosed for improving the strength and impermeability of soils or engineering structures, which comprises the steps of:

(a) applying to the site of the soil or of the engineering structure, an alkaline water glass solution comprising water glass in an amount of 15 to 40% by weight, calculated as dry substance;

(b) allowing a time period to pass sufficient to permit the alkali present in the water glass solution to move by diffusion;

(c) applying to the same site as in step (a), a silicic acid sol comprising $SiO_2$ in an amount of 5 to 50% by weight calculated as dry substance, and an organic dispersion medium in which 10 to 100% by volume of the dispersion medium consists of a water-miscible organic solvent capable of reacting with the alkali content of the water glass solution applied during step (a), thereby gellifying the water glass so that the reaction product of the water-miscible organic solvent and the alkali content of the water glass is trapped within the gelled water glass; and (d) allowing a time period to pass sufficient to permit the respective organic dispersion medium present in the silicic acid sol to move by diffusion, so that gellification of the water glass takes place evenly when mixing of the water glass solution applied during step (a) and the silicic acid sol applied during step (c) to the soils or to the engineering structures takes place to effect a plasticizing effect on the resulting water glass gel.

3 Claims, No Drawings

METHOD FOR IMPROVING THE STRENGTH AND IMPERMEABILITY OF SOILS AND ENGINEERING STRUCTURES

FIELD OF THE INVENTION

The invention relates to a method for improving the strength and impermeability of soils and engineering structures, particularly ducts and pipelines. In the specification and claims the terms "soil" and "engineering structure" should be interpreted in the broadest sense; these terms also covering various storage tanks, tunnels, natural and artificial cavities, rocks, etc., and soils surrounding them.

BACKGROUND OF THE INVENTION

It is well known that most of the engineering structures, such as underground ducts, pipelines and storage tanks, do not possess the required impermeability characteristics, owing, in part, to the inadequate quality of the construction materials and, in part, to defects in the impermeability of pipe connections, or because of deterioration to the engineering structures upon the effect of ageing, traffic, etc. It is also well known that the repair of engineering structures, particularly underground ducts and pipelines, requires enormously high investments and labor, and in most cases the repairs are inadequate.

Hungarian Patent No. 153,975 describes a simple and rapid method for improving the strength and impermeability of soils and engineering structures. According to this method, water glass or a water glass-containing medium is applied into or onto the article to be treated, and then the water glass is exposed to the effect of hydrogen fluoride, silicon tetrafluoride and/or hydrogen silicofluoride. Water glass, when contacted with a gaseous fluoride, rapidly gellifies and completely plugs the leakages, cracks and cavities. When this method is utilized to render underground engineering structures (such as ducts or storage tanks) water-tight, it is an additional advantage that water glass which enters the soil through the cracks solidifies as well, improving thereby the embedding of the structure and strengthening the surrounding soil. Fluoride gases have the additional advantage that they improve the corrosion resistance of concrete and reinforced concrete elements.

Despite its numerous advantages, this method has had only a very narrow application in practice. The widespread application of this method is considerably restricted by the fact that hydrogen fluoride and silicon tetrafluoride are strongly poisonous, thus their use is prohibited in most countries by environmental protection requirements. It is a further disadvantage that the resulting silicic acid gel is not elastic, thus it cannot follow the movements of the article or soil treated. Since the swellability of silicic acid gels is inadequate, these gels cannot plug the new cracks formed in the gel upon movement.

In order to avoid the above disadvantages, methods have been developed in which aqueous acids are utilized to gellify water glass instead of the poisonous acidic fluoride gases, and, to ensure the required elasticity and swellability of the gel, synthetic organic polymers are formed in the gel structure in parallel with gel formation. Such methods are disclosed in Hungarian Patents Nos. 186,586 and 189,250, in the published Hungarian patent application No. 1095/84, as well as in the published international patent application No. PCT/HU-85/00027. A common feature of the techniques disclosed therein is that the gel is formed by admixing two liquids with one another: one of the liquids comprises water glass and organic polymer-forming components, such as polymerizable monomers or a linear polymer to be cross linked, which are compatible with water glass, whereas the other liquid is an aqueous solution of the acid required to gellify water glass and of the substances required to perform polymerization or cross-linking, such as catalyst, initiator, cross-linking agent, etc.

When the appropriate mixing of the two liquids is provided for, hydrogels of good quality, possessing appropriate strength, elasticity and swellability can be formed. However, with the so-called "filling-up" techniques generally applied in soil strengthening and in the water-tight plugging of the defects of engineering structures (particularly underground ducts, pipelines and tunnels) the appropriate mixing of the two liquids generally cannot be ensured throughout the whole section of the soil or engineering structure to be treated. The essence of filling-up technique is that first one of the two liquids, generally the water glass-containing solution, is applied onto the area to be treated e. g. in such a way that the liquid is filled into the duct section to be repaired, and then, after an appropriate waiting time, the excess of the first liquid is optionally removed, and the second liquid, generally the aqueous solution comprising the acid and the substance required for polymerization, is introduced. Through the defect sites of uneven dimensions the liquids enter the soil at an uneven rate, and, as a consequence of the uneven pore and cavity structure of the soil, their movement rate in the soil is uneven, too.

There are considerable local variations between the mixing ratios of the two liquids This means that at certain sites gel cannot be formed at all in the first filling-up cycle, whereas at other sites, depending on the actual mixing ratio, considerable local variations in gel quality can be observed. Thus, e g. when a water glass solution is introduced first and then an aqueous solution which cannot form a gel per se upon neutralization (such as an aqueous solution comprising an acid other than hydrogen silicofluoride and additional non-gelling components, e.g. cross-linking agents, polymerization catalysts, etc.) is applied onto the water glass solution, no gel is formed from the portions of the acidic solution which are in excess or which cannot be mixed with the water glass solution. These portions of the acidic solution flow through the soil section, more or less impregnated with water glass, without utilization, cutting channel-like passages through the soil. These channel-like passages render the gel structure more or less open to water exfiltration; thus the water tightness of the gel formed in the first filling-up cycle is inadequate. A gel with the required water tightness can be obtained only by repeating the filling-up cycle two or more times, which decreases the efficiency of the process and involves a considerable increase in operation costs.

When each of the two liquids comprises a component which gellifies upon neutralization (such as one of the liquids comprises water glass and the other comprises a monomer or oligomer which polymerizes when contacting it with an alkali), uneven mixing of the two liquids (results in that) instead of obtaining a gel with homogenous microstructure in which the organic and mineral parts are amalgamated, a gel consisting of easily distinguishable discrete mineral (silicate) and organic (polymer) blocks, i.e. a gel with nonhomogeneous microstructure is formed. The strength and swelling characteristics of these organic and mineral blocks greatly differ from one another. These gels with nonhomogeneous microstructures combine essentially all the disadvantages of the completely mineral and completely organic gels in the mineral blocks the gel is non-elastic, rigid, and cracks upon soil movements, whereas in the organic blocks the gel is too soft and cannot withstand the damaging effects of higher strains.

Uneven mixing outlined above is a necessary concomitant of all filling up techniques which apply two liquids. In order to avoid the disadvantageous consequences of uneven mixing a pair of gel-forming liquids is required, in which (1) a gel can be formed from both liquids upon a chemical reaction and, (2) the properties of the gels formed separately from the two liquids are highly similar.

Furthermore, in order to decrease the rigidity of the gel and to ensure an appropriate swellability, a substance is required which does not polymerize and gellify per se, but which is able to be built into the gel structure wherein it exerts a plasticizing effect. In order to decrease the disadvantageous consequences of uneven mixing it is desirable that this substance should be able to reach by diffusion even those liquid portions which do not mix with one another.

SUMMARY OF THE INVENTION

Now it has been found that the above requirements can be fulfilled by using a pair of liquids in which one of the liquids is an aqueous solution of water glass optionally also comprising one or more natural or synthetic oligomers or polymers and the other liquid is a silicic acid sol in which the dispersion medium consists, at least in part, of a water-miscible organic liquid which is able to react with the alkali content of the water glass solution, thereby gellifying the water glass.

The gels formed from the water glass solution upon neutralizing its alkali content and from the silicic acid sol upon reacting the organic dispersion medium are both silicate gels with very similar physical properties. Both the alkali present in the water glass solution and the reactive organic dispersion medium present in the silicic acid sol are able to move by diffusion, thus, after a certain period of time, the reaction proceeds even in those liquid portions which have not been mixed with one another or in which mixing has been insufficient. It has also been found that the organic dispersion medium of the silicic acid sol immediately builds into the gel structure in parallel with gel formation and exerts there a plasticizing effect, i.e. leads to the formation of a more swelling and more deformable gel. As a net result, upon the reaction of the alkali present in the water glass solution and the organic dispersion medium present in the silicic acid sol, which proceeds immediately in the well-mixed liquid portions and within a diffusion-controlled period in the less or nonmixed liquid portions, a silicate gel is formed from both liquids which contains the organic dispersion medium or its reaction product entrapped within the gel structure. Gel formation proceeds even at those sites where the mixing of the two liquids is insufficient or the mixing ratio differs from the pre-adjusted value, and the properties of the gel blocks formed at the sites of nonhomogeneous mixing approach those of the gel blocks formed from homogeneous mixtures.

Based on the above, the invention relates to a method for improving the strength and impermeability of soils and engineering structures by forming a silicate gel. According to the invention one proceeds in such a way that an alkaline water glass solution comprising water glass in an amount of 15–40% by weight calculated as dry substance optionally together with one or more natural or synthetic oligomers and/or polymers in an amount not exceeding the dry substance content of the water glass solution is applied to the soil or engineering structure, and a silicic acid sol comprising $SiO_2$ in an amount of 5–50% by weight, preferably 10–45% by weight, calculated as dry substance and an organic dispersion medium in which 10–100% by volume of the dispersion medium consists of a water-miscible organic liquid capable of reacting with an alkali while separation of silicic acid are also applied onto or into the soil or engineering structure to be treated, and the liquids applied are allowed to gellify.

The term "water glass" covers alkali metal (Na, K) and ammonium water glasses and mixtures thereof.

The aqueous solution of water glass may comprise natural and/or synthetic oligomers and/or polymers. Of the natural oligomers and polymers hydrolyzed proteins and natural latex, whereas of the synthetic oligomers and polymers polyvinyl alcohol and butadiene latex are mentioned. Obviously, the oligomers or polymers applied should be alkali-resistant and compatible with the aqueous water glass solution. These polymers are entrapped into the gel structure either physically or chemically upon gel formation, and increase the deformation and swelling ability of the gel.

The silicic acid sols (so-called "organosols") applied in the method of the invention are known or can be prepared by known methods [R. K. Iler; Colloid Chemistry of Silica and Silicates; Cornell University Press, Ithaca, N.Y., pp. 90–95 (1955) and R. K. Iler: The Chemistry of Silica; John Wiley and Sons, N.Y., pp. 33–343 and 415–419 (1979)]. These sols comprise disperse silicic acid particles with a particle size of 3–200 nm, preferably 10–50 nm. The disperse silicic acid particles may be optionally pre-treated on their surface so that mono- or polyvalent alcohols, alkylene oxide oligomers or polymers or $Al^{3+}$ or $Fe^{3+}$ ions can be attached, through the surface hydroxy groups, to the surface of these pre-attached silicic acid particles. The silicic acid sols comprising silicic acid particles pre-treated on their surface are known or can be prepared by known methods, e g. as disclosed in the above textbooks. According to our experiences silicic acid sols comprising silicic acid particles pre-treated on their surface provide better results than those comprising untreated silicic acid particles. The term "silicic acid sol" as used in the specification and claims covers sols comprising such pre-treated silicic acid particles as well.

At least 10% by volume of the dispersion medium of the silicic acid sol should consist of a water-miscible organic liquid capable of reacting with alkaline agents. The term "water-miscible" refers to liquids with unrestricted water miscibility, i.e. which form stable mixtures with water at any ratio. Such organic liquids are e.g. esters, amides, acetals, etc., examples of which are the following: diethylene glycol diacetate, glycerol diacetate, ethylene carbonate, ethyl urethane and formamide. The remainder of the dispersion medium, if any, may consist of any organic liquid unrestrictedly miscible with both water and the organic liquids mentioned above and being unreactive towards alkaline agents; alcohols and ketones are examples of these organic liquids. The dispersion medium may also contain water in an amount not exceeding 80% by volume.

The invention is elucidated in detail by the aid of the following non-limiting Example.

EXAMPLE

A defective duct section with a diameter of 300 mm, bordered by two shafts, is filled up first with 10 m$^3$ of a concentrated aqueous water glass solution (Component A). The losses in water glass solution are supplemented in such a way that the height of the liquid does not drop below 1.5 m. After 30 minutes the liquid is pumped from the duct with a high performance pump within 5 seconds, and the 10 m$^3$ of Component B with the composition given below are filled into the duct section:

| | |
|---|---|
| Glucose diacetate | 2 m$^3$ |
| Ludox CL-X (a silicic acid sol comprising 46% by weight of SiO$_2$; pH = 9.1, sold by E. I. DuPont de Nemours and Co., Wilmington, Delaware, USA) | 3 m$^3$ |
| Diethylene glycol monomethyl ether | 1 m$^3$ |
| Water | 4 m$^3$ |

The liquid height is maintained at 1.5 m in the duct by supplementing Component B until exfiltration stops (for about 60 minutes). Thereafter the excess of Component B is pumped from the duct.

The quality of repair was checked by the water pressure test. No reduction in water level could be observed, which means that the repair was perfect.

What we claim is:

1. A method for improving the strength and impermeability of soils or engineering structures, which comprises the steps of:

(a) applying to the site of the soil or of the engineering structure, an alkaline water glass solution comprising water glass in an amount of 15 to 40% by weight, calculated as dry substance;

(b) allowing a time period to pass sufficient to permit the alkali present in the water glass solution to move by diffusion;

(c) applying to the same site as in step (a), a silicic acid sol comprising SiO$_2$ in an amount of 5 to 50% by weight calculated as dry substance, and an organic dispersion medium in which 10 to 100% by volume of the dispersion medium consists of a water-miscible organic solvent capable of reacting with the alkali content of the water glass solution applied during step (a), thereby gellifying the water glass so that the reaction product of the water-miscible organic solvent and the alkali content of the water glass is trapped within the gelled water glass; and (d) allowing a time period to pass sufficient to permit the respective organic dispersion medium present in the silicic acid sol to move by diffusion, so that gellification of the water glass takes place evenly when mixing of the water glass solution applied during step (a) and the silicic acid sol applied during step (c) to the soils or to the engineering structures takes place to effect a plasticizing effect on the resulting water glass gel.

2. The method for improving the strength and impermeability of soils or of engineering structures defined in claim 1 wherein according to step (c) the silicic acid sol comprises silicic acid particles with mono- or polyvalent alcohols, alkylene oxide oligomers, or polymers, or Al$^{3+}$ or Fe$^{3+}$ ions bonded to their surfaces.

3. The method for improving the strength and impermeability of soils or of engineering structures defined in claim 1 wherein according to step (c) the silicic acid sol comprises as the water-miscible organic solvent diethylene glycol diacetate, glycerol diacetate, methylene carbonate, ethyl urethane or formamide.

* * * * *